C. A. WEED.
MIRROR ATTACHMENT FOR AUTOMOBILES.
APPLICATION FILED JUNE 26, 1914.

1,114,559.

Patented Oct. 20, 1914.

Witnesses:

Inventor
Chester A. Weed

UNITED STATES PATENT OFFICE.

CHESTER A. WEED, OF BROOKLYN, NEW YORK.

MIRROR ATTACHMENT FOR AUTOMOBILES.

1,114,559.  Specification of Letters Patent.  Patented Oct. 20, 1914.

Application filed June 26, 1914. Serial No. 847,393.

*To all whom it may concern:*

Be it known that I, CHESTER A. WEED, a citizen of the United States, residing at Brooklyn, in the county of Kings and State of New York, have invented certain new and useful Improvements in Mirror Attachments for Automobiles, of which the following is a specification.

This invention relates to attachments for automobiles, and particularly to reflecting mirror attachments therefor, the object of the invention being to provide an improved reflecting mirror attachment whereby the exact location of a vehicle on the road in the rear may be accurately ascertained.

Figure 1:
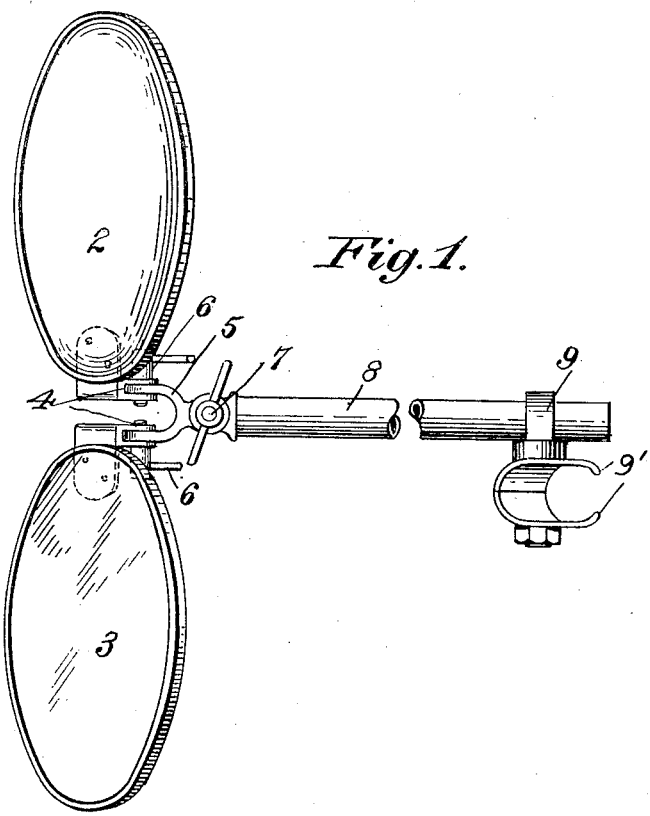
Figure 2:
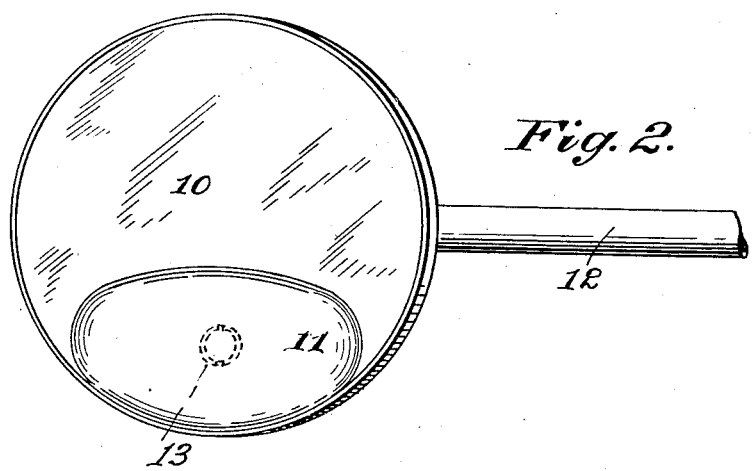

In the drawings accompanying and forming part of this specification, Figure 1 is a perspective view of one form of the present improvement; and Fig. 2 is a perspective view of another form thereof.

It is now usual for an automobilist to apply to his car, either to the wind shield or the fender, or to some other accessible place, a reflecting mirror. These mirrors have been made of two kinds, to wit of convex form and known as a reducing mirror, and of plane form and known as a true mirror. The kind more commonly used is the reducing mirror. This reducing mirror, if properly set, usually gives a full rear view of the road for quite some distance back, but, as is known to every automobilist, it is deceptive and therefore dangerous, in that it is impossible to determine exactly how far back the vehicle in the rear may be, for in this mirror a vehicle may seem to be a long distance in the rear when as a matter of fact it is only directly in the rear of the car, so that it is not infrequent that the driver of a car, thinking that the vehicle is a long distance in the rear, starts to turn or curves into the middle of the road directly in front of a car in the rear which he had no means of knowing was so close.

In some instances a true mirror is used, but this mirror gives only a comparatively small view of the road in the rear, and it is possible to see a car in the rear only when it is at a certain place and very close to the rear of the front car, so that it is of very little assistance to a driver, as not only is it impossible to see the entire road in the rear, but it is impossible to ascertain the approach of a vehicle in the rear except when it is almost upon the front car. The gist of the present improvement, therefore, is the provision of means which will accurately determine the exact location of a car in the rear while at the same time permitting a vision of practically the entire road for some distance in the rear. To accomplish this purpose I have provided, as shown in Fig. 1, a pair of mirrors located one at the side of the other, in the present instance one above the other, one of which, as 2, is a reducing mirror and the other, as 3, is a true mirror. These mirrors may be of the same size or of different sizes, as occasion may require. Any suitable means for supporting these mirrors in juxtaposition and in suitable adjusted relation may be used. In the present instance I have shown a suitable bracket for this purpose. Each mirror is provided with a projection 4 secured at its rear, one being secured to the mirror 2 adjacent to the bottom and the other secured to the mirror 3 adjacent to the top, although these parts may be secured to the mirror in any desired position, as at the center or otherwise, as may be found most desirable in practice. To each of these projections, which are shown of bifurcated form, is secured by a suitable clamp 6 a curved bracket 5 adapted to carry a rod 8 carrying at its end some suitable form of clamp, as a bifurcated clamp 9 having suitable clamping portions 9' which may be secured to a wind shield or other accessible part of the car. In the present instance the curved bracket 5 is secured to the rod 8, as at 7, so that these parts are adjustable relatively to each other and the two mirrors are adjustable relatively to the curved bracket, while the rod 8 is rotatable relatively to its clamp 9, so that practically a universal adjustment of the mirrors is obtainable; that is to say, the two mirrors may be rotated as one by rotating the rod 8, and they may be adjusted relatively to each other and relatively to the clamp 5, and they may also be adjusted relatively to the rod 8 to set them so that the proper focus of each of the mirrors may be obtained. It will, of course, be understood that instead of the clamping means shown at 7 a universal joint may be used if preferred, and the entire bracket may be secured to each of the mirrors by a universal joint, such as a ball and socket joint, if preferred.

In the form shown in Fig. 2 the two mirrors are combined in one, the mirror 10 for instance being a true mirror and the mirror 11 a reducing mirror of elliptical, circular or other form set into or upon the other, or this arrangement may be reversed if preferred in practice and the mirrors secured in position by means of a suitable bracket of the same general form and having the same general adjustments as shown in Fig. 1, and a further detail description thereof is therefore deemed unnecessary.

In practice the rod 8 may be swung downward so that by the provision of some suitable clamping means at the end thereof it may be secured to a fender or other horizontal portion of the car.

It will be understood that any suitable desired supporting means for the reducing and true mirrors may be used, whether combined in the form shown in Fig. 1 or as shown in Fig. 2, and that the various details may be more or less modified without departing from the spirit and scope of this improvement.

In the form shown in Fig. 1, as hereinbefore stated, one mirror is placed above the other, and this is likewise true of the form shown in Fig. 2, one mirror being on top of the other, although, as hereinbefore stated, one may be set into the other, as may be found most desirable in practice.

In the form shown in Fig. 2 the reducing mirror is shown of convex form and of smaller diameter than the true mirror, and is located within the margin of the latter, but in some instances this situation might be reversed, and in order to obtain the proper focus of the respective mirrors the smaller diameter mirror may be so located with relation to the other that it is shiftable transversely thereof, and this may be obtained in one way by locating the reducing mirror in an annular or other form of recess, according to the shape of the mirror, of the other mirror or just in front of it and pivotally connecting it in the rear to the back of the supporting mirror, so that it is shiftable on an axis to permit the proper focus to be obtained, as shown in dotted lines in Fig. 2. By making this axis in the form of a suitable joint, such as a universal joint 13, this reducing mirror may be swung in any desired direction relatively to its supporting mirror. In practice, with the form shown in Fig. 2, it is preferred to set the reducing mirror within the margin of the true mirror, since the reducing mirror can be made of much smaller size than the true mirror owing to its increased range of vision. In either of the forms shown herein it will be seen that the two mirrors are adjustable relatively to each other to obtain the proper focus.

In those cases where it is possible to properly focus the two mirrors without the adjustment of one relatively to the other, one mirror may be fixed to the other one within the margin of the other as shown for instance in a general way in Fig. 2; but where it is desirable to properly adjust one to a considerable extent relatively to the other to obtain a better focus, then it is desirable to arrange one mirror so that it will be adjustable relatively to the other even when one mirror is within the margin of the other as in Fig. 2, and this is provided for in one way by the construction hereinbefore described.

The practical use of these mirrors will be readily understood without a detailed description. That is to say, the driver of a car, by a mere glance in the reducing mirror,—which, as is well known, by reason of its increased range of vision, reduces everything to a much smaller scale, so that, as hereinbefore stated, it is difficult to determine with any degree of accuracy how near or far away a vehicle in the rear is,—observes a vehicle somewhere in the rear and then merely glances into the true mirror, and if he does not see the vehicle in that mirror it will be entirely obvious to him that the car is not within a short distance of the rear of his car, but if he sees the car in the true mirror, whether or not he observes it in the reducing mirror, he will know immediately that the rear car is very closely approaching and is thus warned of possible danger and can manipulate his car accordingly, all of which is readily and quickly ascertainable by a mere glance of the eye. Of course it is possible to obtain this same result by the use of these mirrors by locating a device near the seat of the car, into which the driver may glance and by reflection therein see exactly what he would otherwise see by glancing into the mirrors, but this, of course, would still require the use of the mirrors shown herein.

It will be understood that in the form shown in Fig. 2 one mirror may be secured to the other at the bottoms of both, or in any other suitable way, so that one is adjustable relatively to the other, instead of by the means shown.

It is to be understood that the terms " reducing " and " true " as used herein and in the claims are merely intended to be relative terms indicating that mirrors of different reflecting values are used, whether one is a reducing and another an enlarging mirror, or one an enlarging and another a true mirror, or, as shown herein, one a true and another a reducing mirror, and I do not desire to limit myself to this exact selection of mirrors.

I claim as my invention:

1. A reflecting mirror attachment for automobiles, comprising a true mirror and a reducing mirror, and means for supporting it.

2. A reflecting mirror attachment for automobiles, comprising a true mirror and a reducing mirror one above the other, and means for supporting it.

3. A reflecting mirror attachment for automobiles, comprising a true mirror and a reducing mirror of different sizes, and means for supporting it.

4. A reflecting mirror attachment for automobiles, comprising a true mirror and a reducing mirror of different sizes and one above the other, and means for supporting it.

5. A reflecting mirror attachment for automobiles, comprising a true mirror and a reducing mirror, and means for supporting it, said supporting means including adjustable means whereby the said mirrors may be adjusted relatively to each other and relatively to said supporting means.

6. A reflecting mirror attachment for automobiles, comprising a true mirror and a reducing mirror one above the other, and means for supporting it, said supporting means including adjustable means whereby the said mirrors may be adjusted relatively to each other and relatively to said supporting means.

7. A reflecting mirror attachment for automobiles, comprising a true mirror and a reducing mirror of different sizes and one above the other, and means for supporting it, said supporting means including adjustable means whereby the said mirrors may be adjusted relatively to each other and relatively to said supporting means.

8. A reflecting mirror attachment for automobiles, comprising a pair of mirrors, one a true mirror and the other a reducing mirror, means connecting the two, and means for supporting said connecting means.

9. A reflecting mirror attachment for automobiles, comprising a pair of mirrors, one a true mirror and the other a reducing mirror, means connecting the two, and means for supporting said connecting means, said connecting and supporting means being adjustable relatively to each other and adjustable relatively to said mirrors whereby said mirrors may be set in different positions relatively to each other.

10. A reflecting mirror attachment for automobiles, comprising a pair of attached mirrors, one a true mirror and the other a reducing mirror, means for connecting said mirrors and adjustably attached to each, whereby said mirrors may be adjusted relatively to said connecting means and relatively to each other, and means for supporting said connecting means, said supporting means having an adjustment relatively to said connecting means.

11. A reflecting mirror attachment for automobiles, comprising a pair of attached mirrors, one a true mirror and the other a reducing mirror, means for connecting said mirrors and adjustably attached to each, whereby said mirrors may be adjusted relatively to said connecting means and relatively to each other, means for supporting said connecting means, said supporting means having an adjustment relatively to said connecting means, and means for securing said supporting means in position, said supporting means being adjustable relatively to said securing means.

12. A reflecting mirror attachment for automobiles, comprising a pair of mirrors, one a convex mirror and the other a plane mirror, means for connecting said mirrors in juxtaposition, and means for supporting said connecting means, said connecting and supporting means being relatively adjustable and said mirrors and connecting means being also relatively adjustable whereby the said mirrors may be set in various positions and also adjusted relatively to each other.

13. A reflecting mirror attachment for automobiles, comprising a pair of mirrors one located within the margin of the other and one comprising a true mirror and the other a reducing mirror, and means for supporting said mirrors.

14. A reflecting mirror attachment for automobiles, comprising a pair of mirrors one located within the margin of the other and one comprising a true mirror and the other a reducing mirror, and adjustable means for supporting said mirrors.

15. A reflecting mirror attachment for automobiles, comprising a pair of mirror portions one set within the margin of the other and on top of the other, and means for supporting the same.

16. A reflecting mirror attachment for automobiles, comprising a pair of mirror portions one set within the margin of the other and on top of the other, and means for supporting the same, one of said mirror portions being of less diameter than the other, one of said mirror portions comprising a true mirror and the other a reducing mirror, the latter being set within the true mirror.

17. A reflecting mirror attachment for automobiles, comprising a pair of juxtaposed mirrors, one comprising a reducing mirror and the other a true mirror, the reducing mirror being located above the true mirror, and supporting means therefor.

18. A reflecting mirror attachment for automobiles, comprising a pair of juxtaposed mirrors, one comprising a reducing mirror and the other a true mirror, the reducing mirror being located above the true mirror, supporting means therefor, and means for adjusting said mirrors relatively to said supporting means and relatively to each other.

19. A mirror attachment for automobiles, comprising a pair of mirror portions one a true mirror and the other a reducing mirror and connected together for adjustment one relatively to the other, and means for supporting said attachment.

20. A mirror attachment for automobiles, comprising a true mirror and a reducing mirror located in juxtaposition and connected together for relative adjustment, and means for supporting said attachment, one of said mirrors supported by the other.

21. A mirror attachment for automobiles, comprising a true mirror and a reducing mirror located in juxtaposition and connected together for relative adjustment, and means for supporting said attachment, one of said mirrors supported by the other and having an adjustment relatively thereto and both of said mirrors being adjustable relatively to the supporting means.

Signed at New York, in the county of New York and State of New York, this 25th day of June, 1914.

CHESTER A. WEED.

Witnesses:
F. E. BOYCE,
W. L. BAKELAR.